United States Patent Office 3,109,139
Patented Oct. 29, 1963

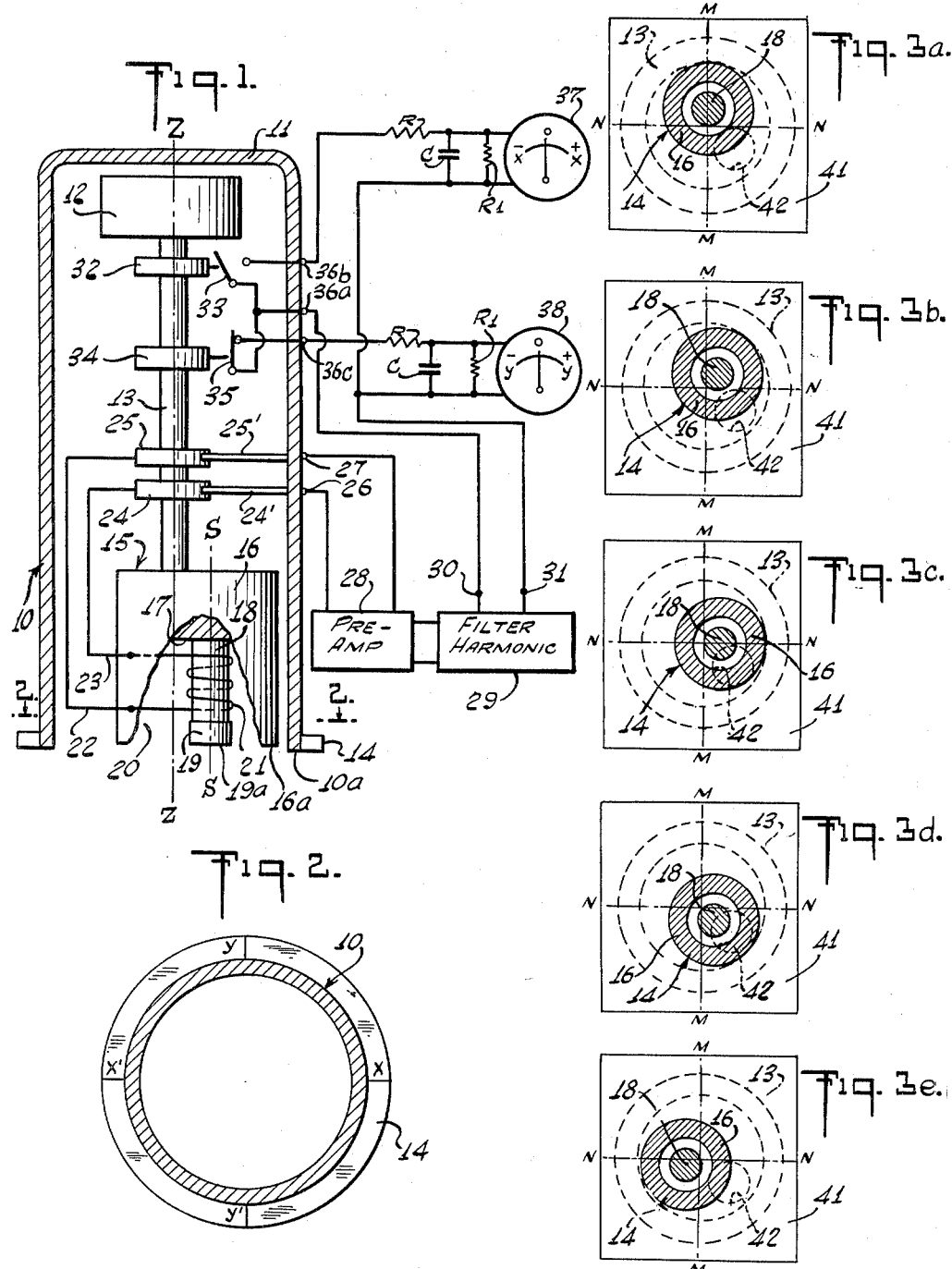

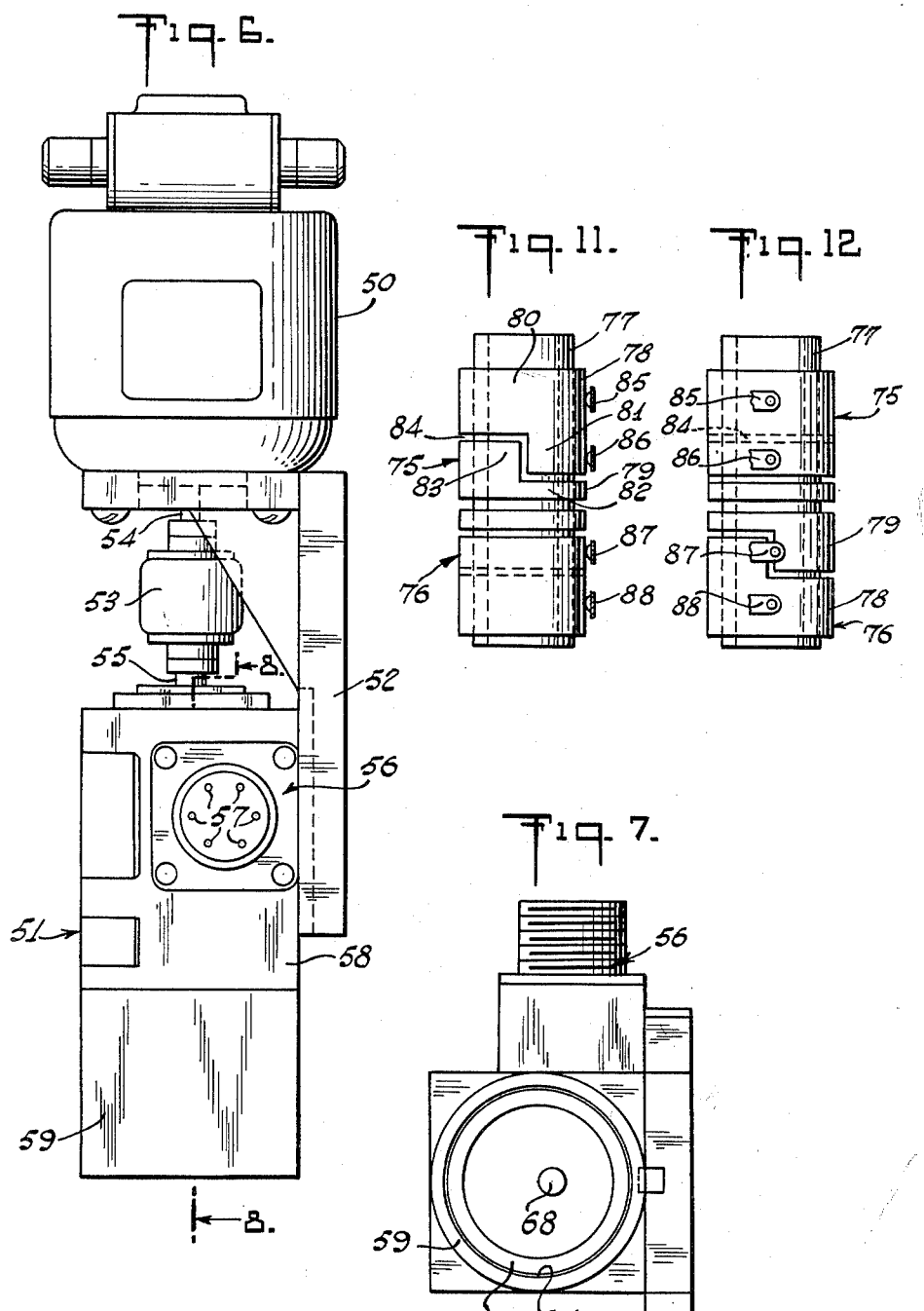

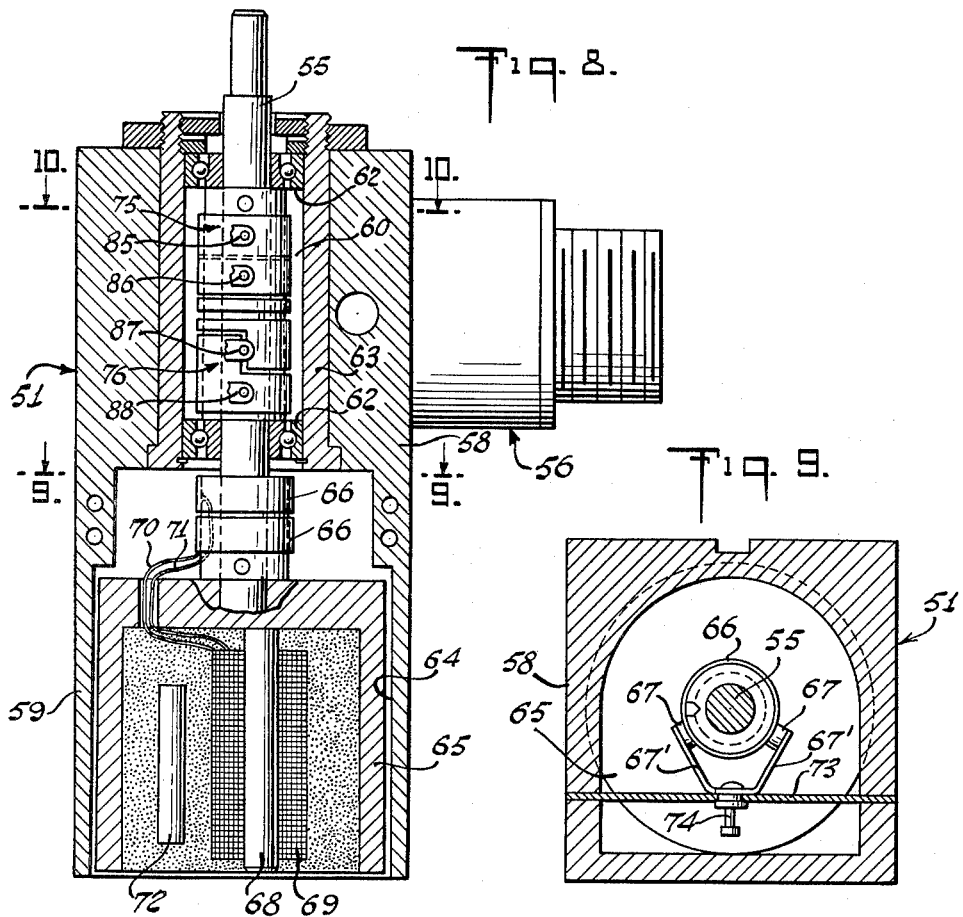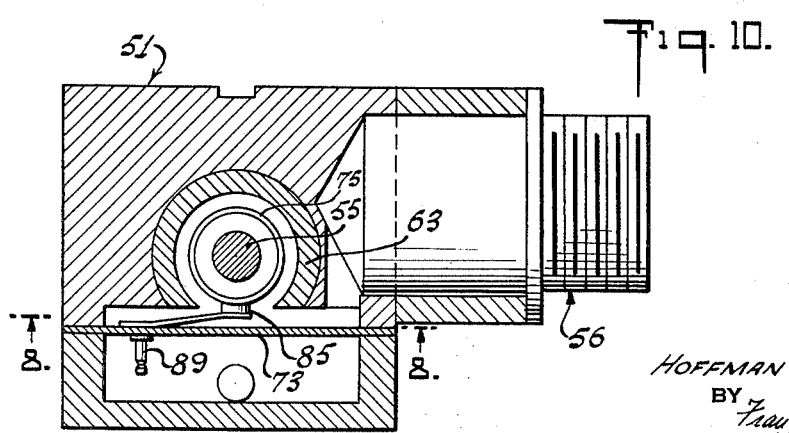

3,109,139
ELECTROMAGNETIC APPARATUS FOR SENSING DISCONTINUITIES IN STRUCTURAL MEMBERS
Hoffman E. Branker, Merrick, N.Y., assignor to Republic Aviation Corporation, near Farmingdale, N.Y., a corporation of Delaware
Filed Apr. 22, 1960, Ser. No. 24,037
8 Claims. (Cl. 324—34)

This invention relates to a method and apparatus for sensing structural discontinuities such as openings, supports and the like that may be hidden by a surface layer and more particularly a device and method for sensing variations in electrical properties of a structure produced by structural discontinuities to be located.

While it will become apparent from the following description that the apparatus and method in accordance with the invention has wide application in industry, for purposes of this description and clarity it will be described in connection with its use in the aircraft industry and more specifically the construction and modification of aircraft frames.

As is well known, present day aircraft structures comprise internal frames or supporting elements to which the outer skin or surface is secured. In the fabrication of these structures as well as in modification and repair, it is frequently necessary to locate structural elements underlying the skin for the purpose of affixing external devices or even the skin itself. For instance, when the skin is fitted to tail and wing sections considerable time is required to locate the position of structural members on the skin so that when the latter is in place, holes can be drilled through the skin and structural members to receive the attaching rivets.

This invention provides an improved method and means for locating structural elements or other discontinuities lying beneath a surface such as the skin of fuselage, as well as measuring or detecting variations in thickness of sheet material. This end is attained through the utilization of electrical characteristics of the material and more particularly variations in such factors as eddy currents and permeability resulting from non-uniformities in the material, or discontinuities in the structure produced by openings, supports and other members disposed beneath a surface layer of material.

It has been found that through a novel and improved arrangement and coordination of elements embodying electromagnetic scanning means, it is possible to locate structural discontinuities beneath a substantially uniform skin or surface and present such information in terms of X and Y coordinates to enable the determination of the nature and form of such discontinuities quickly and easily. This end is attained in accordance with the invention by moving a magnetic sensing element through a relatively small circular path and simultaneously advancing the device slowly over the surface being investigated. With the sensing element moving in a circular path it is possible to sample the resultant signals and produce two sets of signals representing vectors spaced at 90 degrees one from the other and thus enable the operator to plot accurately the size and configuration of any located discontinuity.

It will become more apparent from the following description and accompanying drawings that while the invention is particularly useful in connection with the fabrication and repair of aircraft, it is also useful in a wide variety of applications.

The foregoing objects and advantages of the invention will become more apparent from the following description and accompanying drawings forming part of this application, wherein:

FIG. 1 is a diagrammatic view of one embodiment of the invention with portions thereof sectioned to show certain structural details thereof;

FIG. 2 is a cross-sectional view of FIG. 1 taken along the line 2—2 thereof;

FIGS. 3a to 3e are a series of diagrammatic views illustrating the location of a structural discontinuity with apparatus in accordance with the invention;

FIG. 6 is a side elevational view of a completed sensing head in accordance with the invention;

FIG. 7 is a bottom view of the embodiment of the invention shown in FIG. 6;

FIG. 8 is a cross-sectional view of FIG. 6 taken along the line 8—8 thereof;

Figure 4:
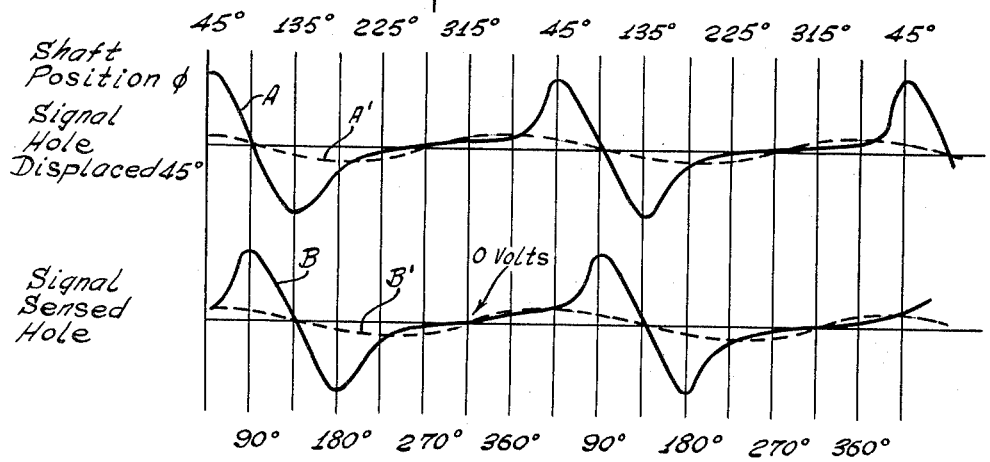
FIG. 4 is a graph illustrating electric signals produced by the sensor in the location of a discontinuity; as, for instance, a hole in an underlying layer.

FIGS. 9 and 10 are cross-sectional views of the sensor shown in FIG. 8 and taken along lines 9—9 and 10—10 thereof;

FIG. 11 is an enlarged side view of the commutator forming part of the sensor shown in FIG. 8; and FIG. 12 is a view of the commutator of FIG. 11 rotated through an angle of 90 degrees.

The sensing system in accordance with the invention will detect discontinuities lying beneath a surface wherein the material producing the discontinuity has a detectable electrical characteristic. In aircraft manufacture wherein aircraft structure is usually formed of aluminum, magnesium or other non-magnetic materials, it has been found that variations in eddy currents produced within the material by subjecting it to the effect of a magnetic field can be detected readily and easily and will serve to determine accurately both the position and the configuration of the discontinuity. In the case of ferrous and other similar metals, changes in permeability of the structure produced by discontinuities are detected by apparatus in accordance with the invention, and, while a different electrical characteristic may be relied upon in the case of other materials, the resultant indications produced by apparatus in accordance with the invention are substantially the same.

It will also become apparent that the sensor or detector is useful in connection with the location of discontinuities in materials other than metals by modifying the characteristics of the magnetic field induced into the material. For instance, in connection with metals, relatively low frequency fields can be applied to effect detection, while in other materials such as the insulators, higher frequencies would be employed.

Referring now to FIG. 1, which illustrates one embodiment of the invention contemplated herein, the sensing device includes an open-end, cylindrical casing 10 closed at one end by a wall 11 which carries a motor 12. The motor shaft 13 is coincident with the axis of the casing 10, the latter being hereinafter referred to as the Z axis. The mounting for the motor 12, as well as the means for providing electrical energy for the motor, may comprise any conventional means, and therefore, are neither shown nor described.

For purposes that will hereinafter be more fully set forth, at least the lower part of the casing 10 adjoining the open end is cylindrical and symmetrically disposed relative to the Z axis. An annular collar or flange 14, preferably made of plastic or other non-magnetic material, surrounds the open end portion of the casing and this collar 14, as may be observed in FIG. 2, carries scribe lines X—X' and Y—Y' to establish two axes normal to each other and which intersect at and are normal to the vertical axis Z.

The lower end of motor shaft 13 carries a sensor 15 comprising a hollow, inverted, cup-like member 16, the end wall 17 of the cup 16 being secured in eccentric relationship to the shaft 13. A polepiece 18 is centrally disposed within the interior of the member 16 and is both mechanically and magnetically joined to the wall 17. The free end of the polepiece 18 is provided with a permanent magnet 19. The polepiece 18 and its associated magnet 19 are disposed symmetrically about a longitudinal axis S—S of the cup member 16 and are dimensioned to provide an air space 20 between their outer surfaces and the adjacent inner surface of the cup member 16. Moreover, the outer end surfaces 16a and 19a of the cup member 16 and polepiece magnet 19, respectively, are substantially coplanar and spaced inwardly of the outer end surface 10a of the casing 10. As shown in FIG. 1, the longitudinal axis S—S of the cup member 16 is disposed parallel to and in spaced relationship with the axis Z—Z to the end that upon rotation of the shaft 13, the cup member 16 with its associated central polepiece 18 and magnet 19 will rotate in a circular path about the axis Z—Z. Since the sensor 15 is mounted eccentrically on the shaft 13 suitable counter-balancing means may be employed to offset or counteract vibration.

A coil 21, disposed about and mounted on the polepiece 18, is connected by leads 22 and 23 to slip rings 24 and 25, respectively, mounted on the shaft for rotation therewith. Conventional contacts 24' and 25' ride on the slip rings 24 and 25 and are connected to output terminals 26 and 27 carried by the casing 10.

As will be more fully set forth below, when the sensor 15 is rotating and the sensing device is moved over the surface of a material to be examined, a discontinuity in the material will cause an electrical voltage, uniquely characteristic of the discontinuity to be generated in the coil 21. This voltage or signal appears at the output terminals 26 and 27 and is translated into two phase-displaced signals for the purpose of indicating the position or location of a discontinuity with respect to the X and Y axes.

While it will become apparent that the signal produced in the coil 21 may be handled in a number of different ways in order to attain the desired result, inasmuch as the signal is of a relatively low amplitude it is desirable to amplify it prior to its translation into two separate phase-displaced signals. Thus, the generated signal appearing across the terminals 26 and 27 is preferably fed to a pre-amplifier 28 and thence to a filter 29 which is preferably arranged to remove all harmonics of the fundamental frequency, though, in some cases, unfiltered signals can be used. The resultant signal from filter 29 appears across the terminals 30 and 31.

Improved coherent phase sensitive detection for producing two phase-displaced signals is illustrated in FIG. 1 and constitutes a pair of cam-actuated switches. One of the switches comprises a cam 32 carried by the shaft 13 and a cooperating switch 33, and the other includes the cam 34 and the cam-operated switch 35. One pole of each switch 33 and 35 is connected to a single output terminal 36a while the other pole of each of the switches 33 and 35 is connected separately to terminals 36b and 36c, respectively. The terminal 36b is connected to an indicator or meter 37 through a resistance R and the signal from the filter is fed to the indicator or meter 37 by a circuit including a connection between the terminal 30 of the harmonic filter and common terminal 36a, and a connection from the terminal 31 of the filter directly to the indicator or meter 37. In order to reduce the ripple in the signal and afford a more constant reading on the meter or indicator 37, a condenser C is connected in parallel with the meter circuit and cooperates with resistor R to attain this end. A second resistor $R_1$ is connected across condenser C to increase the discharge rate of the condenser and cause the meter reading to change rapidly with changes in the sensor position. A second indicator or meter 38 is connected in a manner similar to that described in connection with meter 37 except that the meter 38 is connected to terminals 30 and 31 of the filter 29 through the cam-actuated switch 35, and a similar RC filter is utilized which includes a second set of resistors R and $R_1$ and a condenser C.

The cams 32 and 34 are so constructed and arranged with their respective switches 33 and 35 that during each rotation of the shaft 13 the following switching cycle occurs: at a predetermined angular position of the shaft 13 which is assumed to be zero degrees, switch 33 closes; when shaft 13 is displaced through an angle of 90 degrees, the switch 33 remains closed and the switch 35 closes; at 180 degrees of angular rotation, switch 33 opens but switch 35 remains closed; at 270 degrees of angular rotation, switch 35 opens and during the remaining 90 degrees of rotation of the shaft 13, both switches 33 and 35 are open. In this way each switch, 33 and 35, is operated to remain on or in the closed position for approximately 180 degrees of shaft rotation, and will be open or off for approximately 180 degrees of rotation. The transition from the open to the closed position of one switch is displaced 90 degrees relative to the same transition of the other switch. The operation of the switches 33 and 35 produces phase detection of a signal appearing at the terminals 30 and 31 of the filter 29, and these signals represent X and Y vector components or signals, the magnitude and polarity of which will indicate a discontinuity relative to the X and Y axes of the sensor as previously described.

In the utilization of the invention as shown in FIGS. 1 and 2, the rotating sensor is moved slowly over a surface for the purpose of detecting discontinuities lying beneath the surface and not observable by the naked eye. Assuming that a hole is to be located, as the rotating sensor is moved over or in the proximity of a hole, signals will be developed in the coil 21 and the meters will indicate the position of the discontinuity relative to the X and Y axes of the sensor. By observing the location of the X and Y axes on the ring 14 carried by the sensor 10, the operator can immediately determine in which direction or along which axis or axes the sensor should be moved in order to align the sensor with the opening. If the opening is small with reference to the diameter of the sensing head 15, the sensor can be centered over the opening until both meters will read zero and this will indicate an alignment of the Z axis of the sensor with the center of the opening. If, however, the opening or discontinuity is relatively large or of an irregular configuration, the edge of the opening can be located by positioning the sensor so that one of the meters has a zero or minimum reading, while the other sensor will have a maximum reading. In this way, a number of points can be defined along the edge of a discontinuity and the discontinuity can be accurately located on the surface being investigated. For convenience in marking the location of the Z axis on the surface once the desired readings are obtained, the operator need only mark the surface adjoining the four 90 degree markers on the ring 14 which denote the position of the X and Y axes of the sensor 10. When the sensor is removed, the located position is determined by the intersection of the X and Y axes.

FIGS. 3a through 3e illustrate in greater detail the operation of the invention thus far described. In these figures the rectangular member 41 represents a flat plate of aluminum or other conductive material and having a co-extensive underlying conductive plate including a hole 42. The hole 42 is offset from the intersection of the arbitrary M and N axes and for the purposes of this illustration, the central or Z axis of the detector housing 13 is aligned with the intersection of the M and N axes. When the motor 12 is actuated to rotate the shaft 13 the detecting element including the cup 16 and the central member 18—19 will be moved through a circular path within the housing 13. Since the member 19 of the sensor is a permanent magnet, a flux path is formed which includes the cup 16, the central post 18, the magnet 19 and the circular air gap 20 adjoining the ends of the cup 16 and the magnet 19. For the purpose of this description, the term "sensing path" will be used to define that portion of the flux path between the pole pieces and lying below the plane defined by the lower edge 16a of the cup. This sensing path is effectively in parallel with and shunts the air gap 20. In the operation of the invention, as long as the sensing path is not affected by the presence of irregular elements which affect its reluctance, the flux will remain uniform and under these conditions a voltage will not be induced in coil 21. However, if the reluctance of the sensing path is varied by the presence of an irregular conductive element, the flux linking the magnet 19 through the material being sensed to the edge 16a of the cup 16 will vary in intensity and this variation will result in a generation of a voltage in the coil 21. Assuming now that the detector 15 rotates in a clockwise direction, it will be seen from the series of figures that the flux is, during part of each revolution, through the hole 42. In FIGS. 3a and 3e, however, the hole 42 merely underlies part of the element 16 and during movement of the detector 14 from its position shown in FIG. 3e to its position shown in FIG. 3a. Little change takes place in the relationship of the detector, i.e., the reluctance of the path to the hole 42 that will produce a significant voltage, if any at all, in the coil 21. When the detector moves from the position shown in FIG. 3a to the position shown in FIG. 3b, the hole 42 underlies part of the sensing path and the rate of change of the reluctance of the sensing path as affected by the hole effects a change in the magnetic flux that cuts the coil and produces a voltage. This is shown in FIG. 4. Thus, in FIG. 3b a voltage is generated which increases in proportion with the increase in magnitude of the rate of change of the sensing path reluctance. This voltage attains a maximum when the sensor is in a position as shown in FIG. 3c. In FIG. 3d the voltage drops to zero since maximum hole interception is attained. Thereafter the voltage is reversed (FIG. 3e) and as the sensor 15 continues to move beyond this point, the change of flux will increase in the negative direction until the sensor moves out of overlying relationship with the hole whereupon the voltage again returns to zero.

It will be seen, therefore, that an alternating current signal will be produced through this action and continued rotation of the detector 14 will produce a periodic voltage. The alternating current signal, however, will not be a pure sine wave, but will resemble signals such as those indicated by curves A and B in FIG. 4. However, any alternating current signal from the sensor will be a complex wave, made up of a plurality of sine waves of harmonically related frequencies so that appropriate filtering is preferably employed to remove harmonic components and leave only the lowest or fundamental component as illustrated by curves A' and B'. This can be accomplished by filtering devices such as the RC or RL filters which are well known in the art. The selection of the fundamental A.C. component of the signal would preferably be accomplished prior to the coherent phase sensitive detector (33, 35) of FIG. 1 as illustrated by the filter 29. The filter 29 may either be a separate structure or form part of the amplifier 28.

Assuming that the angular position of the sensor 15, as shown in FIG. 3a, corresponds to the 45 degree position of FIG. 4, then the signal produced by the detector with respect to a hole as shown in FIGS. 3a through 3e, would be represented by curves B and B' of FIG. 4. If, however, the hole 42 is displaced from its position 45 degrees below the N axis and is placed on the M axis by moving it counter clockwise, then the voltage produced would correspond essentially to the curves A and A' of FIG. 4.

Figure 5:
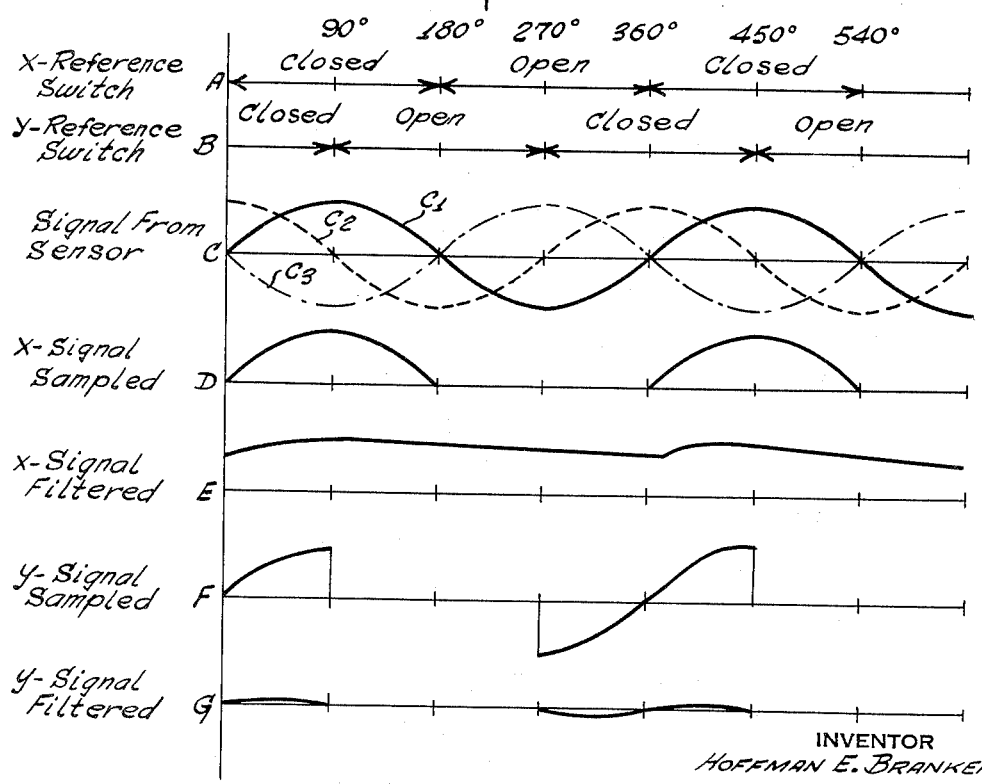
FIG. 5 shows a series of graphs which illustrate the operation of one form of apparatus in accordance with the invention.

FIG. 5 constitutes a series of graphs correlated one with the others to illustrate the operation of the invention. Graphs A and B of FIG. 5 illustrate the switch programming for the X and Y reference switch. It will be observed that the program of the X reference switch lags the program of the Y reference switch by 90 degrees. For instance, the Y reference switch opens at 90 degrees and stays open for approximately 180 degrees. The X reference switch opens at 180 degrees and stays open until approximately 360 degrees. While this programming assumes instantaneous opening and closing of the switches, practical embodiments of mechanical switches necessarily limit the angles during which the switches are open and closed to something less than 180 degrees, though this limitation does not affect the efficiency and precision of the final apparatus.

Graph C illustrates three different filtered signals that may be obtained from a sensor in accordance with the invention. Curve $C_1$ represents a signal of the type that may be obtained from the detector when locating a hole in an underlying member and after filtering the signal actually produced by the sensor. Curve $C_2$ is similar to Curve $C_1$ except that it is advanced in phase and represents a different relative position between the detector and the hole being located. Curve $C_3$ is again similar to $C_1$ but is phased 180 degrees from $C_1$, which would be the equivalent of reversing the positions of the detector and the hole which produced the voltage $C_1$. Assuming now that the sensor produces the voltage $C_1$, this voltage is sampled by the X and Y reference switches and the resultant X signal will comprise the positive half cycles of the voltage $C_1$ since the X reference switch is closed only during the positive half cycles of the voltage $C_1$. The X signal is shown in curve D. By filtering the X signal a curve as shown at E is obtained and constitutes a maximum positive voltage, after several rotations of the sensor.

The Y signal produced by passing the voltage $C_1$ through the reference switch Y will produce a voltage such as that shown in curve F and it will be observed that the first 90 degrees of each so-called signal pulse is negative while the second 90 degrees is positive. This results in a signal having a zero or D.C. component as indicated at G as a result of the smoothing filter. Since the X voltage is at a maximum and the Y voltage is zero, under the conditions outlined above it is evident that the hole being located lies on the X axis and is spaced a distance from the Y axis. This information enables the operator to move the detector or sensor in the proper direction until the hole being located lies in a position aligned with the axis of rotation of the shaft 13.

A practical embodiment of a sensor in accordance with the invention is shown in FIGS. 6 through 12. FIG. 6 is a side elevation of the detector or sensor and includes an electric motor 50 that may be of any suitable type, though a variable speed motor is desirable in order to obtain maximum sensitivity from the sensor under varying conditions. The sensor 51 is secured to the housing of the motor 50 by an L-shaped bracket 52, the latter being attached to both the motor housing and the sensor by any suitable means. A flexible coupling 53 couples the motor shaft 54 to the sensor shaft 55 and compensates for minor variations in alignment between the two shafts. A connector 56 having a plurality of terminals 57 facilitates the attachment of a cable for the transmission of the sensor and reference signals to appropriate computing means as illustrated, for instance, in FIG. 1.

More specifically, the detector 51 includes an essentially rectangular housing 58 with the lower portion thereof being rounded to form a cylindrical extension 59. The shaft 55 of the sensor extends through a central opening 60 in the sensor body and is rotatably carried by bearings 62 disposed within an elongated sleeve 63 secured within the opening 60. The bottom end of the sensor housing 58 has an enlarged opening 64 for receiving an inverted cup-shaped member 65 concentrically carried on the lower end of the shaft 55. Immediately above the cup 65 are a pair of slip rings 66 carried by the shaft and rotatable therewith. These rings are insulated from the shaft and cooperate with a pair of contacts 67, as shown in FIG. 9, for electrically connecting the sensor signals to the connector 56. It will be observed that the cup 65 of the sensor 51 corresponds essentially to the cup 16 of the sensor as shown in FIG. 1 of the drawings except that the former is carried concentrically on the shaft 55. In this embodiment of the invention, however, the central pole piece denoted by the numeral 68 is disposed eccentrically with reference to the cup 65 and in this way produces positional variations in the electro-magnetic field for the purpose of sensing discontinuities. A sensing coil 69 is disposed about the pole piece 68 and is connected by lead wires 70 and 71 to the slip rings 66. The coil 69 is protected within the cup 65 by filling it with an insulating compound such as a plastic material and inserting a counterweight 72 to balance the rotating assembly. The contacts 67 are supported by separate resilient arms 67' carried by an insulating member 73. One of the two terminals 74 is visible in FIG. 9 and the lead wires to the connector 56 have been omitted for simplicity.

Coherent phase sensitive detection is accomplished by two commutator switches 75 and 76 carried by the shaft 55 and disposed between the bearings 62. These commutators are identical though positioned in back-to-back relationship and therefore only the commutator 75 will be described. The commutators are mounted on a tube 77 of insulating material and are each formed of two essentially cylindrical sections 78 and 79 of conductive material. Section 78 of each commutator includes a relatively wide cylindrical part 80 and a semicircular part 81 having an angular width slightly under 180 degrees. The commutator section 79 has a relatively narrow cylindrical portion 82 and a semicircular part 83, the latter having essentially the same height and angular width as the part 81 of commutator section 78. The two commutator portions 78 and 79 are placed on the insulating tube 77 in slightly spaced relationship to form a gap 84 therebetween and thus insulating them one from the other. The gap 84 may be filled with a suitable insulating material to prevent the accumulation of conductive foreign matter.

The contactors cooperating with the commutators 75 and 76 are denoted by the numerals 85, 86, 87 and 88. Fragmentary portions of these contactors are shown in FIG. 8 and the uppermost contactor can be seen in detail in FIG. 10. These contactors are carried by the insulating member 73 and leads, not shown, connect the several terminals 89 to the terminals of connector 56, as previously described. With the commutators in the position as shown in FIGS. 8 and 12, it will be observed that the contactors 85 and 86 of the commutator 75 are riding wholly on the commutator portion 78 of commutator 75 while contactors 87 and 88 of commutator 76 are in the process of transferring from open position to a closed position.

FIG. 11 shows the commutators rotated through an angle of 90 degrees and it will be observed that the contactors 87 and 88 of the commutator 76 are now connected or in a closed circuit position while the contacts 85 and 86 of the commutator 75 are moving into an open circuit position. Thus the two commutators 75 and 76, together with their associated connectors, form switches which operate in the same manner as the switches described in connection with FIG. 1 and function to separate certain portions of the sensor signal for the production of the X component and other portions of the sensor signal for the production of the Y component.

In both of the preceding embodiments of the invention the magnetic field is preferably produced by a permanent magnet and has been found useful for detecting discontinuities in structures formed of conductive materials. In the case of insulating materials wherein both the surface layer and underlying structures are of non-conductive material, such underlying structures can be located by applying a conductive paint or coating to them before the surface layer is applied.

While only certain embodiments have been illustrated and described, it is understood that alterations, changes and modifications may be made without departing from the true scope and spirit as defined by the appended claims.

What is claimed is:

1. Apparatus for sensing discontinuities in structural elements comprising a motor having a driven shaft extending therefrom, electromagnetic field generating means including a cylindrical cup-like member of magnetic material and an elongated pole piece within said cup-like member, said elongated polepiece being magnetically coupled at its inner end to said cup-like member with its outer end terminating substantially in a plane defined by the outer periphery of said cup-like member, said cup-like member and elongated polepiece being carried by said shaft to move at least said elongated polepiece through a circular path when said motor shaft is rotated, a signal producing coil surrounding said polepiece and responsive to changes in flux density flowing through said polepiece during rotation thereof, phase detecting means interconnected with said coil and coordinated with the rotation of said motor shaft to resolve said signal into its vector components and means indicating the magnitude and polarity of said vector components, said polepiece being disposed concentrically within said cup-like member and said member and polepiece being eccentrically secured to said shaft.

2. Apparatus for sensing discontinuities in structural elements comprising a motor having a driven shaft extending therefrom, electromagnetic field generating means including a cylindrical cup-like member of magnetic material and an elongated polepiece within said cup-like member, said elongated polepiece being magnetically coupled at its inner end to said cup-like member with its outer end terminating substantially in a plane defined by the outer periphery of said cup-like member, said cup-like member and elongated polepiece being carried by said shaft to move at least said elongated polepiece through a circular path when said motor shaft is rotated, a signal producing coil surrounding said polepiece and responsive to changes in flux density flowing through said polepiece during rotation thereof, phase detecting means interconnected with said coil and coordinated with the rotation of said motor shaft to resolve said signal into its vector components and means indicating the magnitude and polarity of said vector components, said cup-like member being concentrically secured to said shaft and said polepiece being eccentrically positioned within said cup-like member.

3. Sensing apparatus comprising a hollow housing, a motor carried by said housing, a shaft within said housing driven by said motor, an electromagnetic field generator eccentrically secured to said shaft, said field generator having a cylindrical magnetic polepiece including a signal-generating coil, a second magnetic polepiece magnetically coupled at one end with the first said polepiece with its other end terminating in the plane of the other end of the first said polepiece and spaced therefrom to form an air gap, means including a commutator carried by said shaft, contacts cooperating with said commutator and means interconnecting said coil with said commutator and contacts, said motor upon rotation of the field causing a signal to be generated when said magnetic circuit is non-uniformly influenced by an external body in the vicinity of said air gap and said commutator separating said signal into two individual components phased at 90 degrees one to the other.

4. Sensing apparatus according to claim 3 wherein said second polepiece is an annular cup-like member, said first polepiece is a cylindrical member centrally secured within said cup-like member and said air gap has an annular configuration.

5. Sensing apparatus according to claim 3 wherein said second polepiece has an annular cup-like configuration concentrically secured to said shaft, and the first said polepiece is eccentrically secured within said cup.

6. Sensing apparatus according to claim 5 wherein said housing surrounding said field generator has a cylindrical configuration and extends slightly beyond the said field-generating means.

7. Sensing apparatus comprising an elongated housing having an opening extending therethrough, said opening having a narrow section and an enlarged section and the housing part containing said enlarged opening section having a cylindrical outer configuration, a shaft within said narrow opening section and rotatably supported by spaced journals carried by the housing, at least one commutator on said shaft and disposed between said journals, a cylindrical cup-like member of magnetic material disposed within said enlarged housing opening and concentrically carried by said shaft, an eccentrically mounted polepiece within said cup-like member with the outer end in substantially the plane of the periphery of said member, a coil surrounding said polepiece to produce an electric signal in response to changes in an electromagnetic field flowing through the member and polepiece and means interconnecting said coil and commutators to produce at least two vector components of said signal phased at 90 degrees one to the other.

8. Apparatus according to claim 7 wherein filter means are interconnected with the coil to pass a predetermined low frequency component of said signal and integrating means are interconnected with said commutator to produce resultant signals having magnitudes and polarities corresponding to the average value and polarity of said vector components.

References Cited in the file of this patent
UNITED STATES PATENTS

| | | |
|---|---|---|
| 2,045,258 | Zuschlag | June 23, 1936 |
| 2,255,053 | Gunn | Sept. 9, 1941 |
| 2,679,620 | Berry | May 25, 1954 |
| 2,897,438 | Fearon | July 28, 1959 |
| 2,944,213 | Foerster | July 5, 1960 |